(12) United States Patent
Lin

(10) Patent No.: US 8,611,711 B2
(45) Date of Patent: Dec. 17, 2013

(54) OPTOELECTRONIC TRANSMISSION DEVICE

(75) Inventor: I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 253 days.

(21) Appl. No.: 13/082,409

(22) Filed: Apr. 8, 2011

(65) Prior Publication Data

US 2012/0134624 A1    May 31, 2012

(30) Foreign Application Priority Data

Nov. 29, 2010    (TW) .................................. 99141159 A

(51) Int. Cl.
*G02B 6/26*    (2006.01)
*G02B 6/12*    (2006.01)

(52) U.S. Cl.
USPC .............................................. 385/31; 385/14

(58) Field of Classification Search
USPC ...................................................... 385/31, 14
See application file for complete search history.

(56) References Cited

U.S. PATENT DOCUMENTS

| | | | | |
|---|---|---|---|---|
| 4,945,400 | A * | 7/1990 | Blonder et al. | 257/116 |
| 5,426,526 | A * | 6/1995 | Yamamoto et al. | 349/42 |
| 5,726,751 | A * | 3/1998 | Altendorf et al. | 356/246 |
| 5,827,971 | A * | 10/1998 | Hale et al. | 73/657 |
| 6,112,002 | A * | 8/2000 | Tabuchi | 385/50 |
| 6,567,590 | B1 * | 5/2003 | Okada et al. | 385/49 |
| 6,921,215 | B2 * | 7/2005 | Catchmark et al. | 385/92 |
| 7,298,536 | B2 * | 11/2007 | McCann et al. | 600/310 |
| 2002/0031307 | A1 * | 3/2002 | Kimura | 385/49 |
| 2002/0126356 | A1 * | 9/2002 | Nakanishi et al. | 359/163 |
| 2003/0019838 | A1 * | 1/2003 | Shaw et al. | 216/20 |
| 2004/0014240 | A1 * | 1/2004 | Takeguchi et al. | 436/518 |
| 2004/0042728 | A1 * | 3/2004 | Ito et al. | 385/49 |
| 2004/0129935 | A1 * | 7/2004 | Blauvelt et al. | 257/40 |
| 2008/0298818 | A1 * | 12/2008 | Epitaux et al. | 398/212 |
| 2009/0028575 | A1 * | 1/2009 | Epitaux et al. | 398/139 |
| 2009/0169822 | A1 * | 7/2009 | Chen et al. | 428/158 |
| 2010/0202031 | A1 * | 8/2010 | Feinsod et al. | 359/223.1 |
| 2010/0265983 | A1 * | 10/2010 | Adachi et al. | 372/50.23 |
| 2012/0020627 | A1 * | 1/2012 | Rohlen | 385/90 |
| 2012/0224817 | A1 * | 9/2012 | Hayashi | 385/93 |

FOREIGN PATENT DOCUMENTS

| | | | |
|---|---|---|---|
| JP | 06258238 A | * | 9/1994 |
| JP | 09230177 A | * | 9/1997 |

* cited by examiner

*Primary Examiner* — Kaveh Kianni
(74) *Attorney, Agent, or Firm* — Altis & Wispro Law Group, Inc.

(57) ABSTRACT

An optoelectronic transmission device includes a base, a first optical fiber, a second optical fiber, an optical signal source, a light detector, a carrier, and a monocrystalline-silicon reflector. The first optical fiber transmits first light. The second optical fiber transmits second light. The optical signal source emits the first light. The light detector receives and converts the second light into electrical signals. The carrier has a first through hole and a second through hole. The first optical fiber is received in the first through hole. The second optical fiber is received in the second through hole. The monocrystalline-silicon reflector is positioned on the base and covers the light detector and the optical signal source. The monocrystalline-silicon reflector internally totally reflects the first light from the optical signal source to the first optical fiber and internally totally reflects the second light from the second optical fiber to the light detector.

8 Claims, 5 Drawing Sheets

⟨110⟩

⟨100⟩

⟨111⟩

OPTOELECTRONIC TRANSMISSION DEVICE

BACKGROUND

1. Technical Field

The present disclosure relates to optoelectronic transmission devices.

2. Description of Related Art

Optoelectronic transmission devices include lenses for directing the light. The lenses are made of high-strength plastic with particular optical properties using an injection molding process. However, cost of the lenses is high, which results in a high-cost optoelectronic transmission device.

Therefore, an optoelectronic transmission device, which can overcome the above-mentioned problems, is needed.

DETAILED DESCRIPTION

Figure 1:
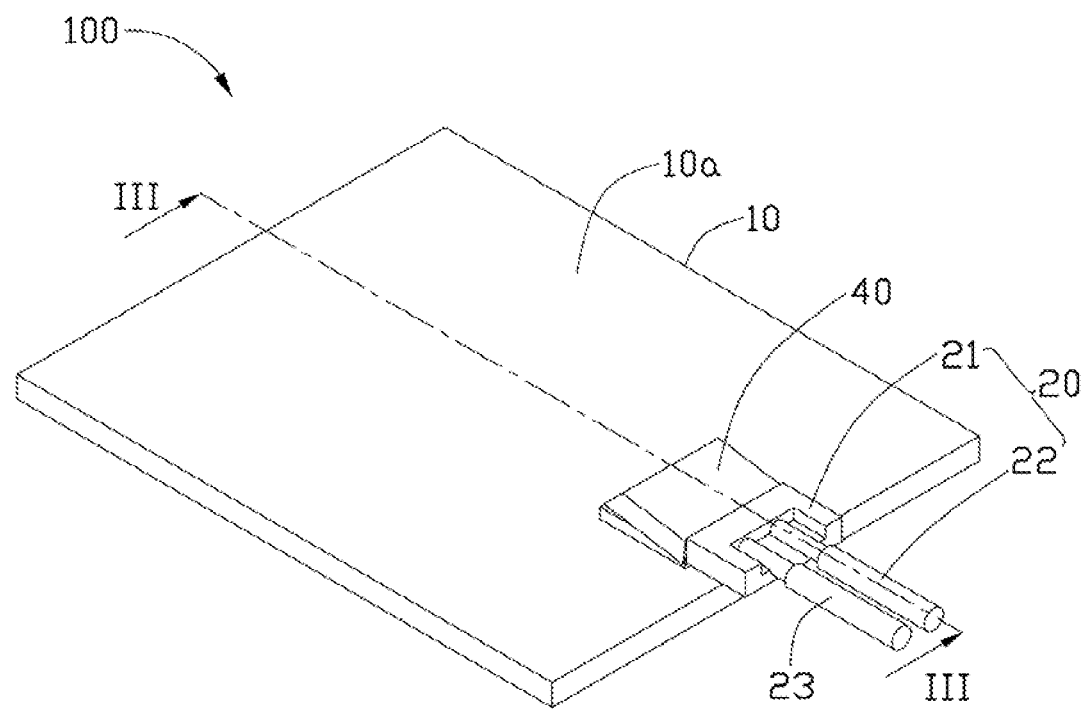
FIG. 1 is a schematic view of an optoelectronic transmission device, according to a first embodiment.
Figure 2:
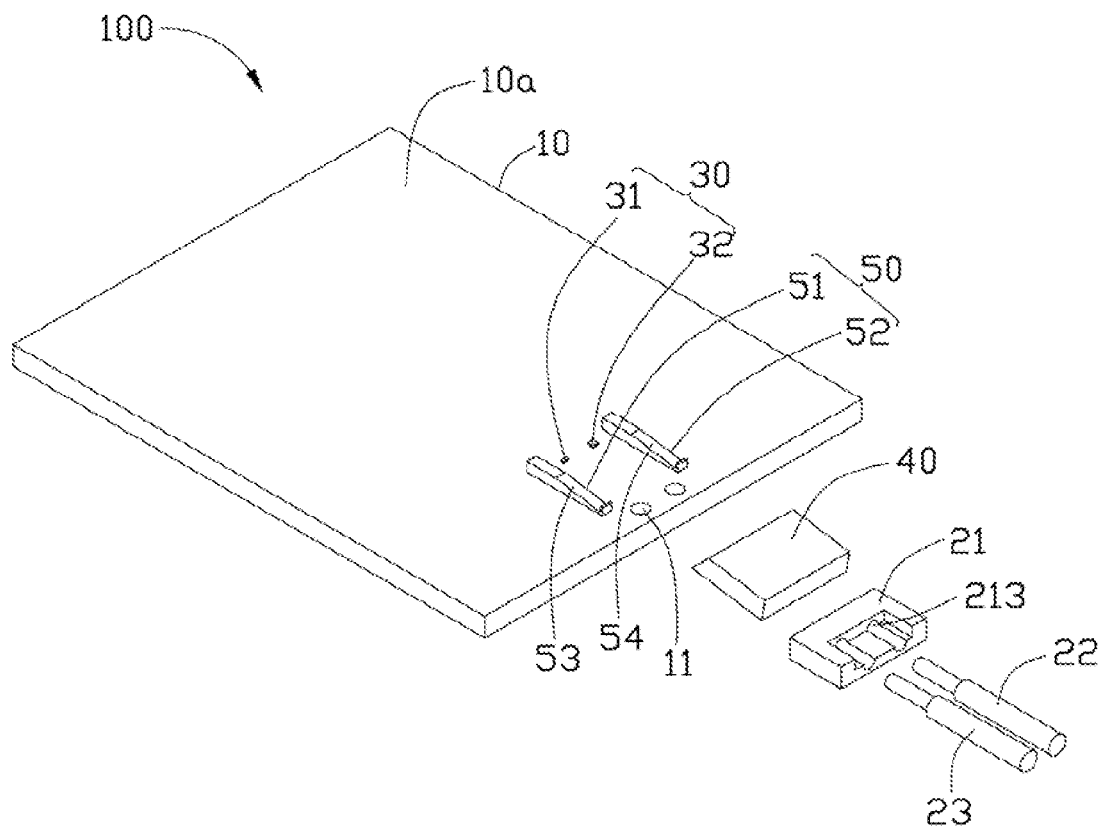
FIG. 2 is an exploded view of the optoelectronic transmission device of FIG. 1.
Figure 3:
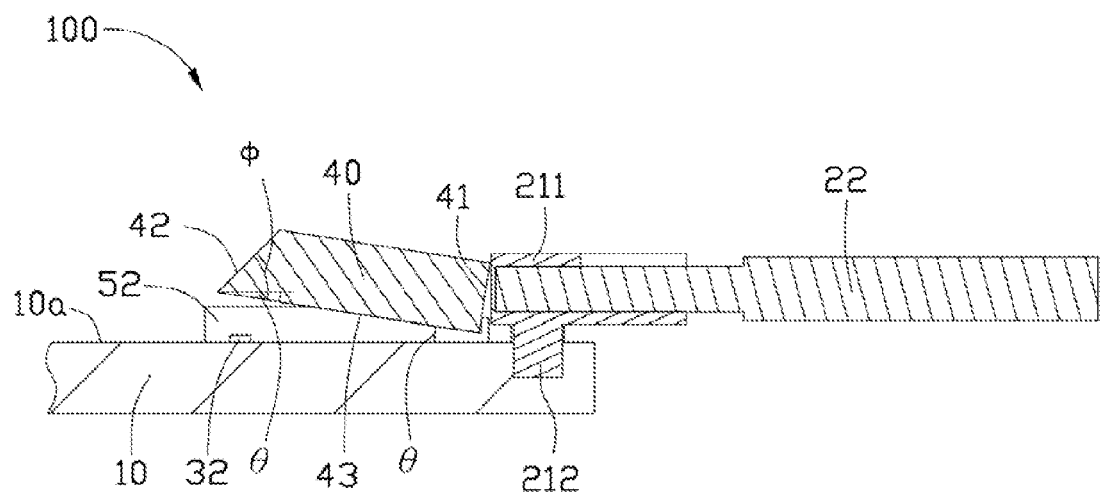
FIG. 3 is a sectional view taken along line of the optoelectronic transmission device of FIG. 1.

Referring to FIGS. 1 to 3, an optoelectronic transmission device 100, according to a first embodiment, includes a base 10, an optical signal transmission module 20, an optical signal processing module 30, a monocrystalline-silicon reflector 40, and a support 50. The transmission module 20, the processing module 30 and the reflector 40 are positioned on the base 10.

The base 10 may be a printed circuit board. The base 10 defines two positioning holes 11.

The transmission module 20 includes a carrier 21, a first optical fiber 22 and a second optical fiber 23. The two optical fibers 22, 23 are secured in the carrier 21. The first optical fiber 22 is configured to output first light from the processing module 30 and the second optical fiber 23 is configured to transmit second light to the processing module 30. It is to be understood that in alternative embodiments, the number of optical fibers may be four or more, depending upon practical need.

The carrier 21 includes a body 211 and two positioning posts 212. The body 211 defines two through holes 213. Each of the through holes 213 extends along a longitudinal direction of a corresponding optical fiber. The two optical fibers 22, 23 are received in the two through holes 213, respectively. The two positioning posts 212 extend from a bottom surface of the body 211 facing the base 10. Each of the positioning posts 212 is securely received in a corresponding positioning hole 11. Therefore, the carrier 21 can be secured on the base 10.

The processing module 30 includes a light detector 31 and an optical signal source 32 positioned on a surface 10a of the base 10. The light detector 31 and the optical signal source 32 are electrically connected to the base 10. The optical signal source 32 may be a laser diode and the light detector 31 may be a photodiode. It is to be understood that in alternative embodiments, the processing module 30 may only include light detector(s) or optical signal source(s), depending upon practical need.

The reflector 40 covers the light detector 31 and the optical signal source 32. The reflector 40 is configured to internally totally reflect the first light from the optical signal source 32 to the first optical fiber 22 and internally totally reflect the second light from the second optical fiber 23 to the light detector 31. Specifically, referring to FIG. 3, the reflector 40 includes a first surface 41, a reflective surface 42, and a second surface 43. The second surface 43 connects the first surface 41 to the reflective surface 42. The first surface 41 is adjacent to and faces the first and second optical fibers 22, 23 of the transmission module 20. The second surface 43 is adjacent to and faces the optical signal source 32 and the light detector 31. The first light emitted from the optical signal source 32 is incident on the reflector 40 through the second surface 43 towards the reflective surface 42. The reflective surface 42 internally totally reflects the first light towards the first surface 41 and finally output from the reflector 40 through the first surface 41 to the first optical fiber 22. The second light from the second optical fiber 23 is incident on the reflector 40 through the first surface 41. The reflective surface 42 internally totally reflects the second light towards the second surface 43 and finally output from the reflector 40 through the second surface 43. The light detector 31 receives the second light from the reflector 40. In this embodiment, the second surface 43 is substantially perpendicular to the first surface 41. An included angle $\Phi$ between the reflective surface 42 and the second surface 43 is about 53 degrees. Since critical angle of total reflection of the silicon is about 24 degrees, the reflective surface 42 is capable of internally totally reflecting light incident on the reflective surface 42 from the first surface 41 and the second surface 43. Furthermore, the monocrystalline silicon can be obtained by epitaxy and this allows mass production of the reflector 40. Thus, cost of the reflector 40 is reduced and production efficiency of the reflector 40 can be increased.

Figure 4:
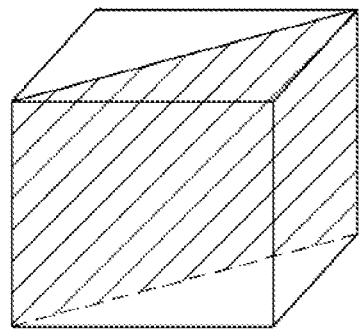
FIG. 4 shows schematic views of three lattice planes of a monocrystalline silicon.
Figure 4:
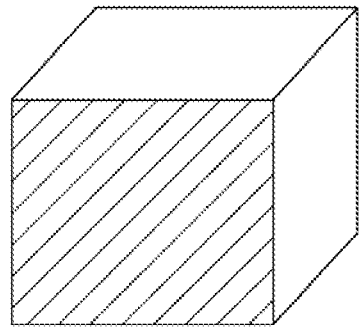
Figure 4:
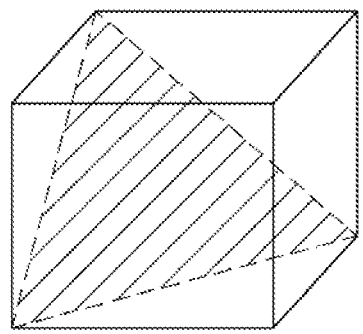

To reduce reflection loss of the light on the reflective surface 42, optical performance of the reflective surface 42 may be optimized. According to a crystal lattice structure of the monocrystalline silicon, the monocrystalline silicon includes three main lattice planes (110), (100), and (111) existing therein (see FIG. 4). Optical performance of the lattice plane (111) may be better than the other two planes. Thus, the reflective surface 42 may be formed by etching or cutting monocrystalline silicon along the lattice plane (111).

The support 50 includes a first support arm 51 and a second support arm 52. The first support arm 51 is substantially parallel to the second support arm 52. The light detector 31 and the optical signal source 32 are positioned on the base 10 between the first support arm 51 and the second support arm 52. The first support arm 51 includes a first slanted surface 53 and the second support arm 52 includes a second slanted surface 54. The first slanted surface 53 and the second slanted surface 54 are co-planar and are substantially parallel to the second surface 43. The first slanted surface 53 and the second slanted surface 54 cooperatively support the reflector 40 in place. Distance between the first slanted surface 53 and the surface 10a of the base 10 gradually increases from the first optical fiber 22 to the optical signal source 32. Distance between the second slanted surface 54 and the surface 10a of the base 10 gradually increases from the first optical fiber 22 to the optical signal source 32.

To reduce light transmission loss, an incident angle of the light on the reflective surface 42 is about 45 degrees. Therefore, an included angle θ of the first (second) slanted surface 53 (54) between the surface 10a of the base 10 is in the range from about 7 to about 9 degrees, such as the included angle θ is equal to about 8 degrees. Under these circumstances, the first surface 41 is slightly inclined with respect to the surface 10a of the base 10, which is acceptable.

Figure 5:
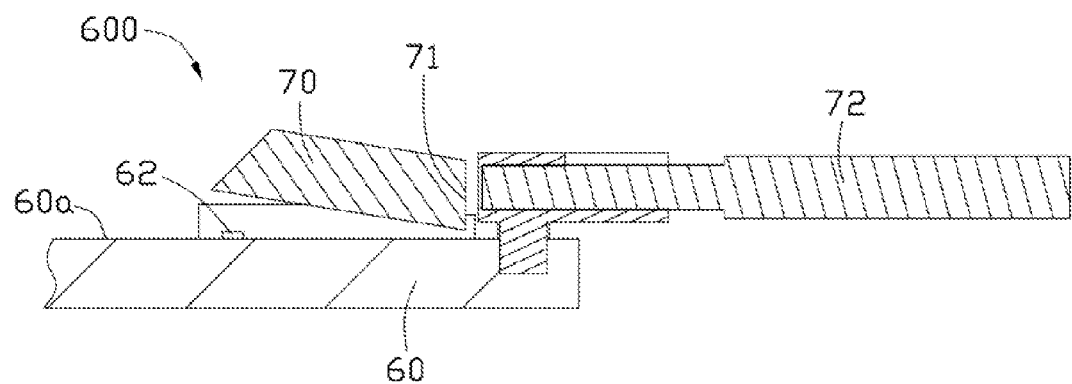
FIG. 5 is a sectional view of an optoelectronic transmission device, according to a second embodiment.

Referring to FIG. 5, an optoelectronic transmission device 600, according to a second embodiment, is shown. The difference between the optoelectronic transmission device 600 and the optoelectronic transmission device 100 of the first embodiment is that a first surface 71 of a monocrystalline-silicon reflector 70 is substantially perpendicular to a surface 60a of a base 60 where an optical signal source 62 and a light detector (not shown) are positioned. A longitudinal direction of an optical fiber 72 is substantially perpendicular to the first surface 71. Light transmission ratio can be further enhanced.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optoelectronic transmission device, comprising:
a base;
a first optical fiber configured to transmit first light;
a second optical fiber configured to transmit second light;
an optical signal source positioned on the base and configured to emit the first light;
a light detector positioned on the base and configured to receive and convert the second light into electrical signals;
a carrier positioned on the base, the carrier having a first through hole and a second through hole, the first optical fiber received in the first through hole, the second optical fiber received in the second through hole, the carrier comprising a body and a first positioning means on a bottom surface of the body facing the base, the base comprising a second positioning means on a surface of the base where the optical signal source and the light detector are positioned, the first positioning means engaging with the second positioning means to secure the carrier and the base together; and
a monocrystalline-silicon reflector positioned on the base and covering the light detector and the optical signal source, the monocrystalline-silicon reflector configured to internally totally reflect the first light from the optical signal source to the first optical fiber and internally totally reflect the second light from the second optical fiber to the light detector.

2. The optoelectronic transmission device of claim 1, wherein the monocrystalline-silicon reflector comprises a first surface facing the first and second optical fibers, a reflective surface and a second surface facing the optical signal source and the light detector, the second surface connecting the first surface to the reflective surface, the reflective surface configured to internally totally reflect the second light towards the second surface, the reflective surface configured to internally totally reflect the first light toward the first surface.

3. The optoelectronic transmission device of claim 1, wherein an included angle between the reflective surface and the second surface is 53 degrees.

4. The optoelectronic transmission device of claim 1, wherein longitudinal directions of the first optical fiber and the second optical fiber are substantially perpendicular to the first surface.

5. The optoelectronic transmission device of claim 1, wherein longitudinal directions of the first optical fiber and the second optical fiber are substantially parallel to a surface of the base where the optical signal source and the light detector are positioned.

6. The optoelectronic transmission device of claim 1, wherein incident angles of the first light and the second light on the reflective surface are 45 degrees.

7. The optoelectronic transmission device of claim 1, further comprising a support positioned on the base and supporting the monocrystalline-silicon reflector in place.

8. The optoelectronic transmission device of claim 7, wherein the support comprises two support arms, the optical signal source and the light detector being positioned between the two support arms, each of the support arms comprising a slanted surface, an included angle between the slanted surface and a surface of the base where the optical signal source and the light detector are positioned being in the range from 7 degrees to 9 degrees.

* * * * *